ALFRED MARZOCCHI &
DAVID E. LEARY
INVENTORS

BY
*Staelin & Overman*
ATTORNEYS

United States Patent Office 3,725,123
Patented Apr. 3, 1973

3,725,123
GLASS FIBER REINFORCED ELASTOMERS
Alfred Marzocchi and David E. Leary, Cumberland, R.I., assignors to Owens-Corning Fiberglas Corporation
Filed Dec. 21, 1970, Ser. No. 99,792
Int. Cl. C03c 25/00
U.S. Cl. 117—126 GE
13 Claims

ABSTRACT OF THE DISCLOSURE

This invention is addressed to the improvement in the bonding relationship between glass fibers and elastomeric materials with which the glass fibers are combined in the manufacturer of glass fiber reinforced elastomeric products wherein the bonding relationship between the glass fiber surfaces and the elatomer is improved by coating individual glass fibers, or impregnating bundles of glass fibers, with a resorcinol aldehyde latex system formulated to include a low molecular weight component, preferably in the form of an alkanolyl donor compound which is believed to migrate toward the glass fiber surfaces to enhance the bonding relationship between the glass fibers and the elastomeric material.

---

This invention relates to elastomeric products reinforced or otherwise combined with glass fibers and it relates more particularly to the method and compositions employed in the treatment of the glass fibers to enhance the bonding relationship between the glass fibers and the elastomeric materials for making fuller utilization of the desirable characteristics of the glass fibers in their combination with the elastomeric materials.

The term "glass fibers," as used herein, shall refer to (1) continuous fibers formed by the rapid attenuation of hundreds of streams of molten glass and to strands formed when such continuous glass fiber filaments are gathered together in forming; and to yarns and cords formed by plying and/or twisting a number of strands together, and to woven and non-woven fabrics which are formed of such glass fiber strands, yarns or cords, and (2) discontinuous fibers formed by high pressure steam or air directed angularly downwardly into multiple streams of molten glass issuing from the bottom side of a glass melting bushing and to yarns that are formed when such discontinuous fibers are allowed to rain down gravitationally onto a foraminous surface wherein the fibers are gathered together to form a sliver which is drafted into a yarn; and to woven and non-woven fabrics formed of such yarns of discontinuous fibers, and (3) combinations of such continuous and discontinuous fibers in strand, yarn, cord and fabrics formed thereof.

As used herein, the term "elastomer" is meant to include natural rubber in the cured or uncured stage, vulcanized or unvulcanized stage, and synthetic organic elastomeric materials such as butadiene-styrene copolymer, butadiene-acrylonitrile copolymer, chloroprene, isoprene, neoprene, isobutyl rubber and the like elastomeric polymers and copolymers in their cured or uncured stages, and vulcanized or unvulcanized stages. Included also are the EPDM rubbers, such as formed by the interpolymerization of ethylene, an alpha monoolefin having from 3–20 carbon atoms, such as propylene, and a polyene, such as dicyclopentadiene, 1–4 hexadiene and preferably an alkylene or alkylidene norbornene, such as 5-alkylidene-2-norbornene and the like in which the alkylidene group numbers from 2–12 carbon atoms, and polysulfone rubber.

The invention is addressed to the fuller utilization of the desirable characteristics of glass fibers, such as their high strength, flexibility, thermal stability, chemical stability, inertness, electrical resistance and heat conductive characteristics when used in combinations with elastomeric materials as a reinforcement or as a stabilizing agent in belt manufacture, as reinforcing cords and fabrics to increase strength, life, wearability, and service characteristics in ruber tires, and as a reinforcement and the like in other elastomeric coated fabrics and molded elastomeric products.

It is an object of this invention to provide a new and improved composition which may be used as a forming size for treatment of glass fibers in forming or preferably as an impregnating composition for treatment, in forming or afterwards, of bundles, yarns, cords, strands and fabrics formed of glass fibers to enable fuller utilization to be made of the desirable characteristics of the glass fibers when used in combination with elastomeric materials in the manufacture of glass fiber reinforced molded products and coated fabrics.

More specifically, it is an object of this invention to provide a composition for use in the treatment of glass fibers in forming to improve the processing and the performance characteristics of the glass fibers as a reinforcement for elastomeric materials and for use in the treatment of bundles, strands, yarns, cords and fabrics of glass fibers, in forming or afterwards, to enhance their bonding relationship when used in combination with elastomeric materials in the manufacture of glass fiber reinforced plastics, laminates or coated fabrics and it is a related object to provide a method and means for making fuller utilization of the strength properties of glass fibers when used as a reinforcement for elastomeric materials.

These and other objects and advantages of this invention will hereinafter appear and, for purposes of illustration, but not of limitation, an embodiment of the invention is shown in the accompanying drawing in which—

Figure 1:
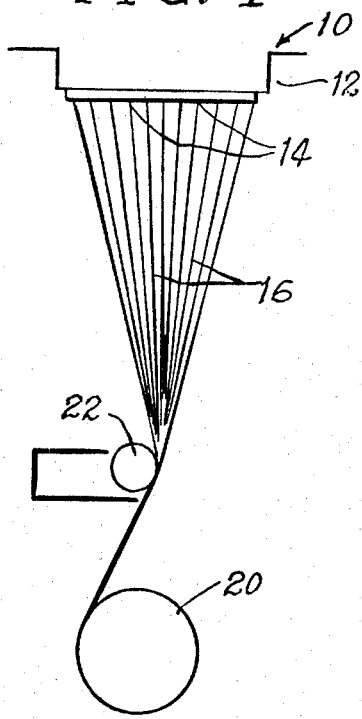
FIG. 1 is a flow diagram showing the manufacture of continuous glass fibers and the treatment thereof in forming to improve the processing charactedistics of the glass fibers and to improve the performance characteristics of the glass fibers when used in combination with elastomeric materials in the manufacture of glass fiber reinforced elastomeric products.

Until recently, glass fibers which have been added or otherwise incorporated with elastomeric materials, in the form of continuous or chopped fibers, have functioned more or less as a filler than as a reinforcement, or flexibilizing agent, or stabilizing agent. As a result, little, if any, improvements in mechanical and physical properties have been made available from the combinations which made use of glass fibers in products formed of elastomeric materials. It is believed that the failure to make fuller utilization of some of the more desirable properties of the glass fiber components resides in the inability properly to integrate the glass fibers with the elastomeric system.

Investigations have been conducted over the past several years by the most highly skilled in the art in the attempt to make fuller utilization of the glass fiber components formulated into elastomeric materials in the endeavor to fabricate products having new and improved physical and mechanical properties. Substantial inroads are now being made as represented by the practice of this invention, as will hereinafter be described.

In copending application Ser. No. 398,305, filed Sept. 22, 1964, description is made of the use of a combination of a resorcinol aldehyde resin with a natural rubber latex hereinafter referred to as RFI, as an adhesive composition in the treatment of glass fibers to enhance the bonding relationship between glass fibers and elastomeric materials in the manufacture of glass fiber-elastomeric materials. Such RFL systems are commercially available from the U.S. Rubber Company under the trademark "Lotol," such as "Lotol 5440," and can be prepared in accordance with the methods described in Canadian Pat. No. 435,754.

As described in the foregoing Canadian patent, the RFL system is prepared by reacting resorcinol and a lower aliphatic aldehyde and preferably formaldehyde, in aqueous medium in the presence of a primary or secondary aliphatic amine to form an aqueous solution of a resin which can be added to an alkaline latex, without resulting in precipitation of the resin or in coagulation of the latex. For this purpose, use is preferably made of at least 1.3 moles of amine and at least 2.0 moles of formaldehyde per mole of resorcinol. The resulting composition is quite stable and can be used in the treatment of glass fibers as described in the above mentioned copending application.

The theory underlying the effectiveness of the use of RFL systems for bonding glass fibers to elastomeric materials is not completely understood at the present time. However, investigations have revealed that when glass fibers in the form of treated individual filaments or in the form of treated bundles of fibers, are stripped from elastomeric materials, there is no clear interface between the RFL associated with the glass fibers and the elastomeric materials with which the treated glass fibers are combined. Thus, it is believed that the low molecular weight components of the RFL ssytem, and specifically the resorcinol formaldehyde resin component, migrate from the RFL system toward the surfaces of the glass fibers, particularly during cure or vulcanization of the treated glass fibers in combination with elastomeric materials, to further enhance the bonding relationship between the glass fiber surfaces and the elastomeric material.

It has now been found that the bonding relationship between glass fibers and elastomeric materials can be further enhanced by formulating the RFL system to include a low molecular weight component in the form of an alkanolyl donor compound. Without limiting the present invention as to theory, it is believed that the alkanolyl donor compound serves to enhance the adhesion characteristics of RFL systems by migration toward the glass fiber surfaces during cure or vulcanization of the treated glass fibers in combination with elastomeric materials in the manufacture of glass fiber-reinforced elastomeric products and the like.

In accordance with the practice of the invention, it is preferred to make use of alkanolyl donor compounds in the form of a low molecular weight reaction product of resorcinol and a lower aliphatic aldehyde, such as acetaldehyde, propionaldehyde and preferably formaldehyde, containing at least one free alkanolyl group per mole. The exact nature of the alkanolyl compound can vary widely, depending somewhat upon the relative ratios of the resorcinol and formaldehyde reactants. For example, the reaction may proceed in accordance with one or more of the following equations

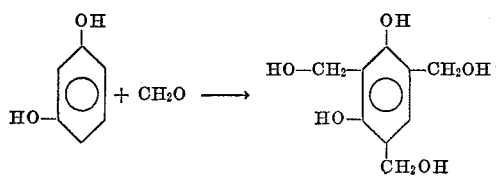

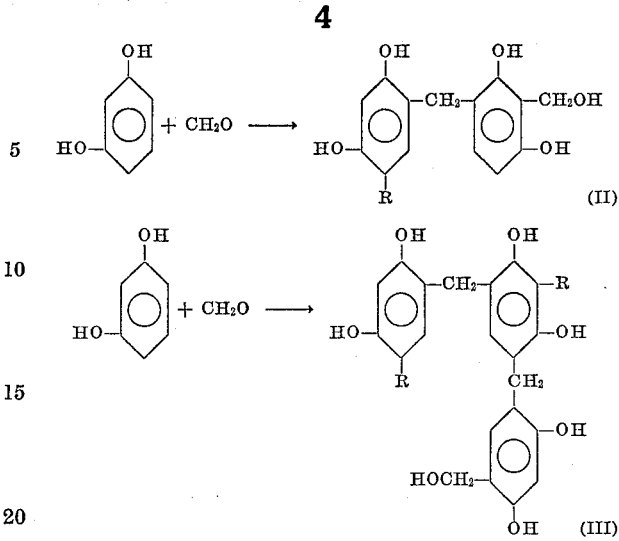

wherein R is either hydrogen or a methylol group.

It will be understood by those skilled in the art that equations (I), (II) and (III) above are only illustrative of products which can be formed. Thus, the preferred alkanolyl donor compounds useful in accordance with the practice of the present invention include polymethyl resorcinol compounds, and preferably trimethylol resorcinol, and low molecular resorcinol aldehyde resins. As will be appreciated, use can also be made of mixtures of two or more of the foregoing, particularly where it is desired to make use of the low molecular weight reaction product of the reaction between resorcinol and an aldehyde without separating the reaction mixture into individual compounds. In general, best results are usually achieved when use is made of a compound or mixture having a molecular weight or average molecular weight less than 1000, and preferably 200 to 1000. Such molecular weights are sufficiently low as compared with the average molecular weight of the resorcinol aldehyde resin component of RFL systems, which generally range from 40,000 to 100,000, to insure the desired migration of low molecular weight components of the modified RFL system toward the glass fiber surface during cure or vulcanization of the treated glass fibers while in combination with elastomeric materials.

While not equivalent to the methylol donor compounds derived from resorcinol and formaldehyde described above, use can also be made of alkanolyl donor compounds derived from phenolic compounds such as phenol, melamine or urea, and aliphatic aldehydes of the type described above, and preferably formaldehyde. In addition, use can also be made of low molecular weight epoxides which are capable of migrating in an RFL system toward the glass fiber surfaces and reacting with the RFL matrix on cure or vulcanization.

The amount of alkanolyl donor compound or mixture used in combination with RFL systems in accordance with the practice of the present invention is not critical and can be varied within wide limits. Best results are usually achieved when the alkanolyl donor material constitutes up to about 15% by weight of the modified RFL system on a solids basis, and preferably 1 to 10% by weight.

Having described the basic concepts of the invention, reference is now made to the following examples which are illustrative of the practice of the invention in a composition for treating glass fibers as a size composition in forming or afterwards, and preferably as an impregnating composition for the treatment of glass fibers in the form of strands, yarns, cords or fabrics, hereinafter referred to as bundles, in which the individual glass fibers have preferably, though not necessarily, been treated with a conventional glass fiber size composition which has preferably been formulated to include organo silane glass fiber anchoring agent. Such conventional size composition may be illustrated by the following:

EXAMPLE 1

Forming size composition:                        Percent by wt.
   Partially dextrinized starch _____ 8.0
   Hydrogenated vegetable oil _____ 1.8
   Cationic wetting agent (lauryl amine acetate) _ 0.4
   Nonionic emulsifying agent _____ 0.2
   Gamma-aminopropyltriethoxy silane _____ 1.0
   Water _____ 88.6

EXAMPLE 2

Forming size composition:                        Percent by wt.
   Saturated polyester resin _____ 3.2
   Fatty acid amine wetting agent (Nopcogen 16 L) _____ 0.1
   Polyvinyl alcohol _____ 0.1
   Pyrrolidine _____ 3.0
   Gamma-aminopropyltriethoxy silane _____ 0.3
   Glacial acetic acid _____ 0.1
   Water _____ 93.2

EXAMPLE 3

Forming size composition:                        Percent by wt.
   Paraffin wax in aqueous emulsion _____ 0.2
   Cationic amide polyester resin _____ 1.3
   Polyglycol condensate (300 to 400 mw.) ___ 2.3
   Gelatin _____ 0.25
   Gamma-aminopropyltriethoxy silane _____ 0.5
   Dibasic ammonium phosphate _____ 0.1
   Glacial acetic acid _____ 0.2
   Water _____ 95.15

EXAMPLE 4

Forming size composition:                        Percent by wt.
   Gamma-aminopropyltriethoxy silane _____ 0.5
   Fatty acid amine wetting agent (Nopcogen 16 L) _____ 0.25
   Water _____ 99.25

Referring now to the schematic diagram of FIG 1, the glass is melted in a glass melting furnace 10 having a bushing 12 on the bottom side. The bushing is formed with a plurality of openings extending therethrough and the molten glass flows gravitationally through the hundreds of small openings in the bushing to form therein streams 14 which are rapidly attenuated into fine glass filaments 16 by winding the filaments about a rapidly rotating drum 20. The filaments 16 are sized with one of the size compositions of Examples 1 to 4 as they are gathered together to form a strand. For this purpose, use is made of an applicator 22 which is illustrated as a wiping pad that is constantly wet with the forming size composition. The filaments of glass are each wet with the size composition as they are gathered together to form the strand 18 that is wound about the drum 20.

The sized strands are allowed to air dry or drying of the thin size coating can be accelerated by exposure to elevated temperature such as a temperature within the range of 150° to 250° F. The applied size forms a very thin coating 24 on the surface of the glass fibers 16 to impart a desired balance of lubricity and bending without destroying the fibrous characteristic or appearance of the fiber.

The strand 18 of sized glass fibers is preferably plied with other stands and twisted to form yarns, threads, or cords which may be used as a reinforcement for elastomeric materials, with or without cutting to shorter lengths, and which can be formed into woven or nonwoven fabrics for subsequent combination with elastomeric materials.

After the fibers have been processed into strands, yarns, cords or fabrics, hereinafter referred to generally as bundles, the bundles of sized glass fibers are impregnated with a composition embodying the features of this invention, as represented by the following examples:

EXAMPLE 5

A resorcinol formaldehyde latex is prepared in accordance wtih the procedure described in Canadian Pat. No. 435,754. Solution A is prepared by dissolving 100 parts by weight of resorcinol in 180 parts by weight of an aqueous solution containing 25% by weight dimethylamine. Similarly, solution B is prepared by mixing 100 parts by weight of 25% aqueous dimethylamine and 225 parts by weight of an aqueous 35.6% by weight solution of formaldehyde.

Thereafter, solution B is cooled to a temperature below 5° C. and solution A is slowly added with continuous stirring while the temperature is maintained below 5° C. After solutions A and B are mixed, the mixture is allowed to reach room temperature to thereby form a clear reddish brown mixture having a pH of about 8.9. The average molecular weight of the resin in solution is determined to be about 50,320.

The resin solution is then admixed with an alkaline latex to form the following composition:

Parts by wt.
Natural rubber latex (60% solids) _____ 100.0
Antioxidant _____ 1.0
Resin solution _____ 15.0
Water to provide solids content of 40%.

The resulting RFL composition has a ratio of resorcinol to natural rubber in the latex of about 2.5, and a total solids content of about 40%.

Thereafter, 2,4,6-trimethylol resorcinol is added to the above composition to form the following impregnating composition.

Impregnating composition:                        Parts by wt.
   Natural rubber latex (60% solids) _____ 100.0
   Antioxidant _____ 1.0
   Resorcinol formaldehyde resin solution ____ 15.0
   Trimethylol resorcinol _____ 6.0
   Water to provide solids content of 40%.

Figure 2:
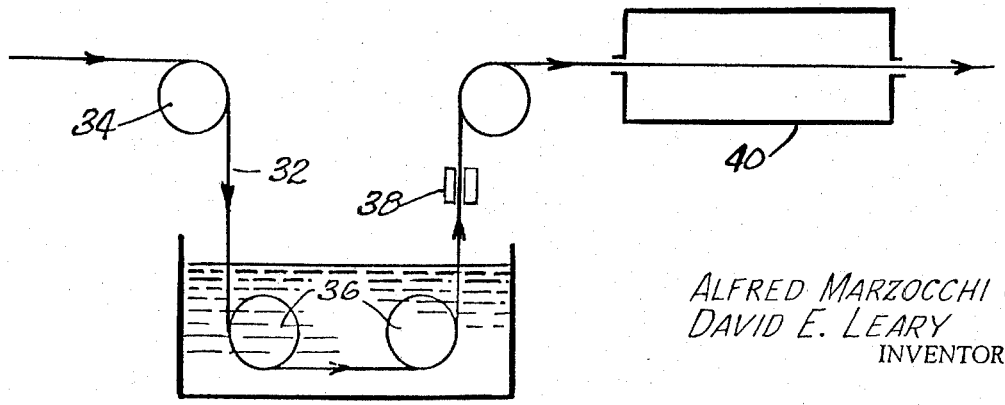
FIG. 2 is a flow diagram illustrating the treatment of glass fibers subsequent to their being formed into bundles, strands, yarns, cords, or fabrics to impregnate the glass fiber bundles in accordance with the preferred practice of this invention.

Impregnation with the aqueous composition of Example 5 can be made by conventional means for impregnation, such as by immersion of the bundles of glass fibers in a bath of aqueous impregnating composition. Referring more specifically to FIG. 2 of the drawing, the glass fiber bunde 32 is advanced over a guide roller 34 for passage downwardly into the bath 35 containing the impregnating composition of Example 5. The bundle is then turned under roller 36 to effect a sharp bend which operates to open the bundle to enable fuller penetration of the aqueous impregnating composition into the bundle of sized fibers for fuller impregnation of the bundle. The impregnated bundle is then raised from the bath for passage through a roller or die 38 which operates to remove excess impregnating composition from the bundle and to work the impregnating composition into the bundle. Thereafter the endless bundle is advanced over the roller 39 into a drying oven preferably in the form of an air drying oven 40 maintained at a temperature above ambient temperature and preferably at a temperature within the range of 150° to 350° F. to accelerate removal of the aqueous diluent and to set the impregnating material in situ in the glass fiber bundle. Drying will occur in a relatively short period of time, ranging from 1 to 30 minutes, depending somewhat upon the temperautre of drying. Alternatively, use can also be made of dielectric treatment to coagulate the latex, with little or no drying.

As will be appreciated by those skilled in the art, the impregnating composition can be formulated to include, if desired, any of a variety of conventional vulcanizing agents such as sulfur and/or zinc oxide and/or conventional accelerators such as mercaptobenzothiazole or allyl cyanurate.

Various amines can be used in lieu of dimethyl amine exemplified in Example 5 for preparing the water soluble high molecular weight resorcinol-aldehyde resin. Amines suitable for this purpose include water soluble amines having the general formula

wherein $R_1$ is alkyl containing 1 to 4 carbon atoms, such as methyl, ethyl, isopropyl, propyl, etc. and $R_2$ is hydrogen or alkyl containing 1 to 4 carbon atoms as described above. Representative amines include methylamine, dimethylamine, diethylamine, ethylamine, methylethylamine, diisopropylamine, isopropylamine, etc.

As pointed out above, the amine compound is preferably used in a ratio of at least 1.3 moles of amine per mole of resorcinol, and the aldehyde in a ratio of at least 2 moles of aldehyde, and most preferably 2 to 8 moles of aldehyde, per mole of resorcinol. The relative amounts of high molecular weight resorcinol aldehyde resin and the elastomer latex are not critical and can be varied within wide ranges. For best results, use should be made of an RFL system containing sufficient elastomer latex to provide a ratio of resorcinol in the high molecular weight resin to elastomer in the latex of 1 to 10 parts by weight resorcinol to 100 parts by weight elastomer.

Additional examples of this concept of the invention can be illustrated by the following:

EXAMPLE 6

A low molecular weight resorcinol formaldehyde resin is prepared by reacting resorcinol and formaldehyde in a molar ratio of 1:3. The resulting product is found to have an average molecular weight of about 350 after removal of unreacted resorcinol and formaldehyde.

This resin is then formulated into the following impregnating composition with a RFL system of the type described in Example 5.

| Impregnating composition: | Parts by Wt. |
|---|---|
| Natural rubber latex (60% solids) | 100.0 |
| Antioxidant | 1.0 |
| Resorcinol formaldehyde resin solution (Av. mw. 45,000) | 15.0 |
| Resorcinol formaldehyde resin (av. mw. 350) | 7.0 |
| Water for solids content of 40%. | |

Application of the foregoing impregnating composition can be made in the manner described with reference to Example 5, to deposit in the glass fiber bundle dry solids constituting 5 to 25% weight, and preferably 10 to 15% by weight, of the impregnated fiber system. For this purpose, use is preferably made of an aqueous impregnating composition having a solid content of 10 to 50% solids by weight.

As indicated above, in accordance with another concept of the invention, use can also be made of methylol donor materials derived from other phenolic compounds in lieu of resorcinol as described above, such as phenol. Thus, the methylol donor material can be in the form of a polymethylol phenol, such as trimethylol phenol, and for a low molecular weight phenol aldehyde resin having an average molecular weight within the range of 200 to 1000. This concept of the invention may be represented by the following example:

EXAMPLE 7

A phenol formaldehyde resin having an average molecular weight of about 400 is prepared by reacting phenol and formaldehyde in a molar ratio of about 5:1 in a conventional manner.

The resulting resin is then formulated into the following impregnating composition formulated to include an RFL system of the type described in Example 5:

| Impregnating composition: | Parts by wt. |
|---|---|
| Natural rubber latex (60% solids) | 100.0 |
| Resorcinol-formaldehyde resin solution (av. mw. 45,000) | 1–30 |
| Phenol-formaldehyde resin (av. mw. 400— 12% solids) | 1–15 |
| Water for solids content of 40%. | |

The foregoing composition can be used to impregnate bundles of sized or unsized glass fibers in accordance with the method described in Example 5.

Similarly, alkanolyl donor materials derived from aliphatic aldehydes of the type described and melamine or urea can also be used in the practice of the invention. For example, as is known to those skilled in the art, melamine undergoes reaction with formaldehyde in a variety of ways as illustrated as follows:

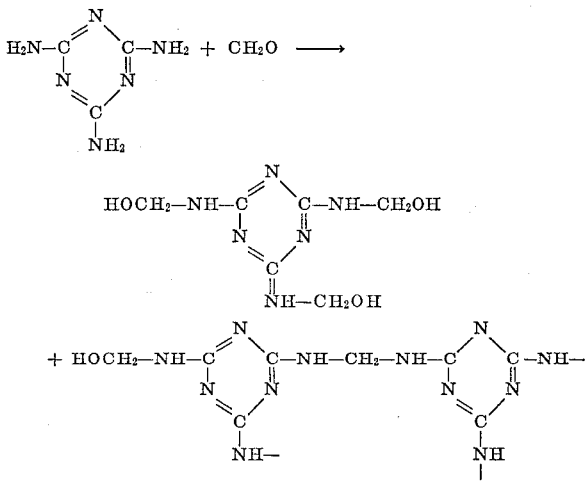

The dangling valences can be —H, —CH$_2$OH or another melamine group, depending on the relative proportions of melamine and formaldehyde.

Thus, in accordance with this concept, use is preferably made of a methylol substituted s-triazine of the formula

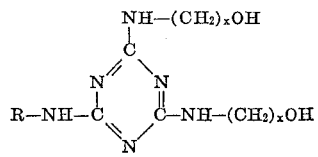

wherein R is either H or —(CH$_2$)$_x$OH wherein $x$ is an integer from 1 to 3 and/or a low molecular weight melamine-aldehyde resin, preferably having a molecular weight within the range of 200 to 1000.

As is also known to those skilled in the art, urea undergoes a similar reaction to provide methylol chains in accordance with the following:

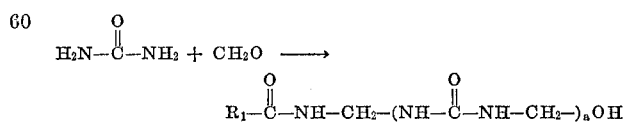

wherein $R_1$ is —CH$_2$OH or NH$_2$ and is a function of the molecular weight. Thus, as the methylol donor compound, use is preferably made of at least one low molecular weight methylol compound having the general formula

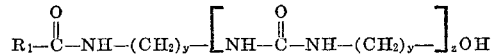

wherein $R_1$ is —NH$_2$ or —(CH$_2$)$_y$—OH and $y$ is an integer from 1 to 3 having a molecular weight of 200 to 1000.

The use of methylol donors derived from melamine and urea can be illustrated by the following examples:

EXAMPLE 8

N,N',N''-trimethylol-s-triazine is prepared by reacting melamine and formaldehyde in a mole ratio of 1:3.

The resulting product is separated from higher boiling products, and is incorporated into an RFL system of the type prepared in Example 5 for use in the treatment of glass fibers.

| Impregnating composition: | Parts by wt. |
| --- | --- |
| Natural rubber latex (60% solids) | 100.0 |
| Anti-oxidant | 1.0 |
| Vulcanizing agent | 3.0 |
| Resorcinol-formaldehyde resin solution (av. mw. 45,000) | 15.0 |
| N,N',N'' - trimethylol - s - triazine | 8.0 |
| Water for solids content of 40%. | |

EXAMPLE 9

A low molecular weight melamine-formaldehyde resin having an average molecular weight of about 625 is prepared by reacting melamine and formaldehyde in a mole ratio 1:5 in a conventional manner.

The unreacted reactants are separated, and the resulting resin is formulated into the following impregnating composition:

| Impregnating composition: | Parts by wt. |
| --- | --- |
| Natural rubber latex (60% solids) | 100.0 |
| Anti-oxidant | 1.0 |
| Resorcinol-formaldehyde resin solution (av. mw. 70,000) | 12.0 |
| Melamine - formaldehyde resin (av. mw. 625) | 8.0 |
| Water for solids content 35%. | |

In preparing low molecular weight melamine aldehyde resins suitable for use in accordance with this concept of the invention, use is preferably made of from 3 to about 12 moles of an aliphatic aldehyde of the type

EXAMPLE 10

A urea-formaldehyde resin having an average molecular weight of about 440 is prepared by reacting urea and formaldehyde in a mole ratio of about 1:2.

The resulting product is a mixture of methylol compounds, which is formulated into the following impregnating composition:

| Impregnating composition: | Parts by wt. |
| --- | --- |
| Natural rubber latex (60% solids) | 100.0 |
| Anti-oxidant | 1.0 |
| Resorcinol-formaldehyde resin solution (av. mw. 50,000) | 15.0 |
| Urea-formaldehyde resin (av. mw. 440) | 8.0 |
| Water for solids content 35%. | |

The following example illustrates the use of a low molecular weight polyepoxide as a low molecular weight component in an RFL system of the type described:

EXAMPLE 11

| Impregnating composition: | Parts by wt. |
| --- | --- |
| Natural rubber latex (60% solids) | 100.0 |
| Anti-oxidant | 1.0 |
| Resorcinol-formaldehyde risin solution (av. mw. 45,000) | 14.0 |
| Resorcinol-formaldehyde resin solution (av. 834) | 7.0 |
| Water for solids content 35%. | |

Application of the foregoing composition can be made in accordance with the method described in Example 6.

It will be understood by those skilled in the art that a wide variety of polyepoxides can be used in accordance with the practice of this invention as the low molecular weight component.

Preferred polyepoxides are those formed by the reaction of a stoichiometric excess of an epihalohydrin, such as epichlorohydrin with a polyhydric phenol, such as bis(4-hydroxyphenyl) - 2,2-propane, bis(hydroxyphenol) methane, hydroquinone, resorcinol, etc., or with a polyhydroxyalcohol, such as polyethylene glycol, sorbitol, etc. These low molecular weight epoxidized materials are characterized by the presence of terminal epoxide groups and can be prepared in accordance with the methods described in U.S. Pats. No. 2,324,483, 2,444,333, 2,494,295, 2,500,600 and 2,511,913. These epoxides are commercially available under the trade name "Epon," such as Epon 812, Epon 828, Epon 834, Epon 1001 and Dow 2337. Other epoxide materials which may be employed in accordance with the present invention are low molecular weight epoxidized polyolefins, epoxidized polydienes as well as a variety of other epoxidized polymers.

It is desirable to achieve as full impregnation as possible into the bundle of glass fibers in order to more effectively separate the fibers one from the other by the impregnating materials since the solids are effective as a coating on the sized or unsized glass fibers to cover the fibers and to protect them against damage by mutual abrasion. Thus, it is desirable to achieve as deep penetration as possible with the impregnating composition into the glass fiber bundle. The deeper the penetration, the more effective will be the bond between the glass fibers in the bundle and the elastomeric material with which the bundles of glass fibers are combined in the subsequent manufacture of glass fiber-elastomeric products. In the final system, the elastomeric material with which the glass fibers are combined will constitute a continuous phase. This continuous phase of elastomeric material may comprise rubbers of the type incorporated as a latex into the impregnating composition, or the elastomeric material derived therefrom. The continuous phase of elastomeric material can be employed in the cured or uncured state or in the vulcanized or unvulcanized state. It is believed that the tie-in between the impregnated bundles of glass fibers and the elastomeric material forming the continuous phase will occur primarily during the curing or vulcanization of the elastomeric material during fabrication of the glass fiber-elastomeric product, during which the low molecular weight components of the impregnating composition of the present invention will migrate toward the glass fiber surfaces to further enhance the bonding of the glass fibers with the elastomeric material.

More complete protection for the individual glass fibers and a closer coordination with the elastomeric material in the continuous phase can be achieved when the impregnating compositions of Examples 5 to 11 are modified for treatment of glass fibers as a size composition which can be applied to the individual glass fibers as they are formed, as illustrated in FIG. 1 of the drawing, or afterwards if the original size, if any, is removed. For this purpose, the impregnating composition of the invention should be formulated to include a glass fiber anchoring agent, such as gamma-aminopropyltriethoxy silane. Instead of gamma-aminopropyltriethoxy silane, in the size or in the impregnating composition, use can be made of a variety of organosilicon compounds, and preferably those which have the general formula

$$R_nSiZ_{(4-n)}$$

wherein $n$ is an integer from 1 to 3, Z is a readily hydrolyzable group, such as halogen (e.g., fluorine, bromine, chlorine, iodine,) or alkoxy containing 1–6 carbon atoms (e.g., methoxy, ethoxy, propoxy, etc.) and, R is an organic group or hydrogen, with the provision that at least one R is an organic group. Preferred organic groups for use in the present invention include alkyl, containing 1–10 carbon atoms, such as methyl, ethyl, propyl, butyl, etc.; alkenyl, containing 2–8 carbon atoms, such as vinyl, allyl, etc.; cycloalkyl containing 4–8 carbon atoms, (e.g., cyclobutyl, cyclopentyl, cyclohexyl, etc.; aryl, containing 6–14 carbon atoms, such as phenyl, naphthyl, etc.; alkaryl, containing 7–15 carbon atoms, such as methylphenyl, ethylnaphthyl, methylnaphthyl, isopropylmethyl, etc.; aralkyl, containing 7–15 carbon atoms, such as propyl, methyl, ethyl, etc.; as well as the amino-, hydroxy- and epoxy-substituted derivatives of the foregoing.

Particularly preferred are the amino silanes having the general formula $$(NH_2-R')_n SiR^2_m Z_{(4-m-n)}$$

wherein $n$ and $Z$ are as described, $m$ is an integer from 0 to 2, and preferably from 0 to 1, R is an organic group, and preferably alkyl, alkenyl, cycloalkyl, and aryl as described above, and R′ is a divalent organic radical, such as alkylene containing 1–8 carbon atoms, such as methylene, ethylene, trimethylene, hexamethylene, etc.; alkenylene containing 2–6 carbon atoms, such as ethylene propenylene; cycloalkylene, containing 5–8 carbon atoms, such as cyclopentylene, cyclohexylene, etc. and arylene, such as phenylene or naphthylene.

Representatives of the foregoing silanes include ethyl trichloro silane, ethyl trimethoxy silane n-butyltriethoxy silane, vinyltrimethoxy silane, allyltriethoxy silane, cyclohexyltriethoxy silane, phenyltrichloro silane, p-tolyltrimethoxy silane, benzyltriethoxy silane, gamma-methacryloxypropyltrimethoxy silane, gamma-aminopropyltrimethoxy silane, bis-(delta-aminobtuyl)diethoxy silane, gamma-aminopropylethyldimethoxy silane, delta-aminobutylvinyldimethoxy silane, gamma-glycidoxypropyltrimethoxy silane, beta-(3,4 - epoxycyclohexyl)ethyltriethoxy silane, 3,4-epoxybutylvinyldimethoxy silane, beta-aminovinyltrichloro silane, gamma-aminoallyldichloro silane, p-aminophenyltriethoxy silane, gamma-hydroxypropylphenyldimethoxy silane and N-(beta-aminoethyl)-gamma-aminopyltrimethoxy silane.

While description of the foregoing organo silane compounds has been made with reference to the use of a silane, it will be understood that the corresponding silanols or polysiloxanes and polymers derived from the foregoing silanes can also be used as anchoring agents in accordance with the practice of this invention. Instead of the organo silicon compounds, use can also be made of a Werner complex compound in which carboxylato can be coordinated with the trivalent nuclear chromic complex containing an amino group or an epoxy group, such as aminopropylato chromic complex, glycidoxy chromic complex, B-alanine chromic complex or glycolato chromic chloride.

Forming size compositions embodying this concept of the invention can be formulated in accordance with the following examples.

EXAMPLE 12

Sizing composition:                             Parts by wt.
Natural rubber latex (60% solids) _____ 100.0
Resorcinol formaldehyde resin solution (av. mw. 45,000) _____ 15.0
Resorcinol formaldehyde resin (av. mw. 350) _____ 7.0
Bis-(delta-aminobutyl)diethoxy silane _____ 1.0
Water for solids content of 10%.

EXAMPLE 13

Sizing composition:                             Parts by wt.
Natural rubber latex (60% solids) _____ 100.0
Resorcinol formaldehyde resin solution (av. mw. 45,000) _____ 1–30
Phenol-formaldehyde resin (av. mw. 400— 12% solids) _____ 1–15
solids) _____ 1–15
Gamma-aminopropylethyldimethoxy silane __ 2.0
Water for solids content of 5%.

EXAMPLE 14

Sizing composition:                             Parts by wt.
Natural rubber latex (60% solids) _____ 100.0
Resorcinol formaldehyde resin solution (av. mw. 70,000) _____ 12.0
Melamine-formaldehyde resin (av. mw. 625) _____ 8.0
Gamma-aminoallyldichloro silane _____ 1.5
Water for solids content of 12%.

EXAMPLE 15

Sizing composition:                             Parts by wt.
Natural rubber latex (60% solids) _____ 100.0
Resorcinol formaldehyde resin solution (av. mw. 50,000) _____ 15.0
Urea formaldehyde resin (av. mw. 440) ____ 8.0
p-Aminophenyltriethoxy silane _____ 2.5
Water for solids content of 8%.

EXAMPLE 16

Sizing composition:                             Parts by wt.
Natural rubber latex (60% solids) _____ 100.0
Resorcinol formaldehyde resin solution (av. mw. 45,000) _____ 14.0
Polyepoxide (Epon 834–Dow, av. mw. 834) __ 7.0
N-(beta-aminoethyl) - gamma-aminopropyltrimethoxy silane _____ 0.5
Water for solids content of 3%.

In general, the glass fiber anchoring agent should constitute between .1 and 5% by weight of the treating compositions in the foregoing examples. Application should be made in an amount to deposit dry solids constituting between 1–10% by weight of the coated glass fibers.

Figure 3:
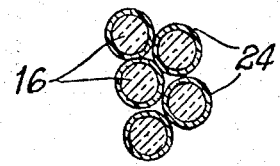
FIG. 3 is a cross-sectional view of glass fibers processed in accordance with the diagram illustrated in FIG. 1.
Figure 4:
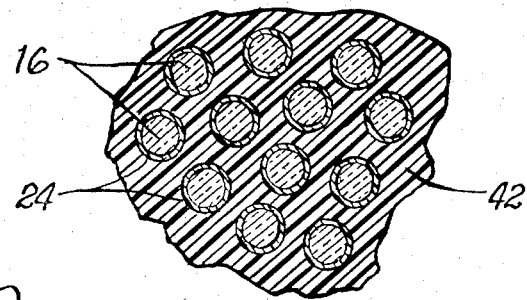
FIG. 4 is a cross-sectional view of a bundle of glass fibers processed in accordance with the flow diagram of FIG. 2.

When the glass fibers are sized in forming with a composition embodying the features of this invention, the sized fibers can be processed directly into sized yarns, strands, cords or fabrics, or used alone in combination with elastomeric materials without the need for impregnation of the bundles of glass fibers since individual fibers 16 of the bundle are already provided with a coating 50 (FIG. 3) formulated to contain the desired components for anchoring the elastomeric material and for protecting the glass fibers to enhance processing and their performance characteristics.

In fabricating the combinations of the glass fibers treated in accordance with the practice of this invention, with elastomeric materials, the glass fibers or bundles of glass fibers are mixed with elastomeric material or otherwise laid down in the desired arrangement for combination with the elastomeric material as in the manufacture of glass fiber reinforced belts or in the manufacture of rubber tires reinforced with cords of glass fibers. The combination of glass fibers and elastomeric material are processed in a conventional manner by molding or cure under heat and compression or by vulcanization for advancement of the elastomeric material to a cured or vulcanized stage while in combination with the treated glass fibers whereby the glass fibers or bundles of glass fibers become strongly integrated with the elastomeric material in the glass fiber-elastomeric product.

It will be understood that the size compositions, represented by Examples 12 to 16, may also be employed as impregnating compositions, preferably with lesser dilution with aqueous medium, since the anchoring agent embodied in the size composition will continue to operate as an anchoring agent further to facilitate the bonding relationship or integration between the elastomeric material of the continuous phase and the treated glass fibers. It will be understood further, that the glass fiber may be impregnated in forming with a size composition represented by Examples 12 to 16, followed by impregnation of strands, yarns, cords, fabrics or bundles formed thereof with compositions of this invention represented by Examples 5 to 11.

It will be apparent that I have provided a new and improved composition for use in the treatment of glass fibers and bundles of glass fibers to enhance their integration with elastomeric materials in the manufacture of glass fiber-elastomeric products.

It will be understood that invention exists not only in the composition for use in the treatment of the glass fibers to prepare the glass fibers for combination with elastomeric materials but that invention exists also in the process in which the compositions are employed in the treatment of glass fibers as well as the treated or impregnated glass fiber products formed thereof.

It will be understood that changes may be made in the details of formulation and methods of application or use without departing from the spirit of the invention, especially as defined in the following claims.

What is claimed is:

1. Glass fibers having a thin surface coating consisting essentially of a mixture of an elastomer, a water-soluble resorcinol-aldehyde resin having an average molecular weight of at least 40,000 prepared by reaction of resorcinol with a lower aliphatic aldehyde in the presence of an amine of the formula

wherein R is an alkyl group and $R_1$ is hydrogen or alkyl, wherein the amine is present in a mole ratio of at least 1.3 based on the resorcinol, the resin being present in an amount sufficient to provide a ratio of 1 to 10 parts by weight resorcinol to 100 parts by weight of the elastomer and a material having a molecular weight less than 1000 selected from the group consisting of (1) an alkanolyl donor prepared by reaction of a compound selected from the group consisting of resorcinol, phenol, melamine and urea with a lower aliphatic aldehyde, and (2) a polyepoxide with the material constituting from 1 to 15% by weight of the total of the elastomer and the resin.

2. Glass fibers as defined in claim 1, wherein the low molecular weight material is an alkanolyl donor prepared by reaction of a compound selected from the group consisting of resorcinol, phenol, melamine and urea with a lower aliphatic aldehyde.

3. Glass fibers as defined in claim 1, wherein the low molecular weight material is a urea-aldehyde resin having the general formula

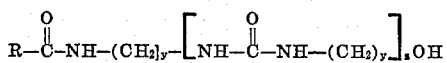

wherein R is selected from the group consisting of —$NH_2$ and —$(CH_2)_y$—OH and y is an integer from 1 to 3.

4. Glass fibers as defined in claim 1 wherein the aldehydes contain 1 to 3 carbon atoms.

5. Glass fibers as defined in claim 1 wherein the low molecular weight material is a polyalkanolyl derivative selected from the group consisting of a trialkanolyl phenol, a trialkanolyl resorcinol and a triazine of the formula

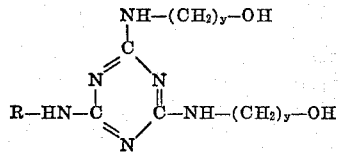

wherein y is an integer from 1 to 3 and R is selected from the group consisting of H and —$(CH_2)_y$—OH, and position isomers thereof.

6. Glass fibers as defined in claim 1 wherein the coating constitutes from 1 to 10% by weight of the coated glass fibers.

7. A glass fiber bundle comprising a plurality of glass fibers having an impregnant therein in the form of solids which separate the fibers from the other, said impregnant consisting essentially of a mixture of an elastomer, a water soluble resorcinol resin having an average molecular weight of at least 40,000 prepared by reaction of resorcinol with a lower aliphatic aldehyde in the presence of an amine of the formula

wherein R is an alkyl group and $R_1$ is hydrogen or alkyl, wherein the amine is present in a mole ratio of at least 1.3 based on the resorcinol, the resin being present in an amount sufficient to provide a ratio of 1 to 10 parts by weight resorcinol to 100 parts by weight of the elastomer and a material having a molecular weight less than 1000 selected from the group consisting of (1) an alkanolyl donor prepared by reaction of a compound selected from the group consisting of resorcinol, phenol, melamine and urea with a lower aliphatic aldehyde, and (2) a polyepoxide with the material constituting from 1 to 15% by weight of the total of the elastomer and the resin.

8. A glass fiber bundle as defined in claim 7 wherein the low molecular weight material is a urea-aldehyde resin having the general formula

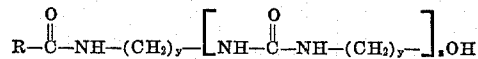

wherein R is selected from the group consisting of —$NH_2$ and —$(CH_2)_y$—OH and y is an integer from 1 to 3.

9. A glass fiber bundle as defined in claim 7 wherein the low molecular weight material is a polyalkanolyl derivative selected from the group consisting of a trialkanolyl phenol, a trialkanolyl resorcinol and a triazine of the formula

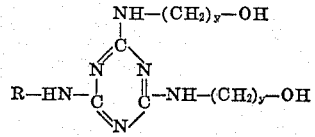

wherein y is an integer from 1 to 3 and R is selected from the group consisting of H and —$(CH_2)_y$—OH, and position isomers thereof.

10. A glass fiber bundle as defined in claim 7 wherein said impregnant constitutes between 5 and 25% by weight of the glass fiber system.

11. A glass fiber bundle as defined in claim 7 wherein the individual glass fibers forming the bundle have a thin size coating on the surfaces thereof.

12. A glass fiber bundle as defined in claim 7 wherein the low molecular weight material is an alkanolyl donor prepared by reaction of a compound selected from the group consisting of resorcinol, phenol, melamine and urea with a lower aliphatic aldehyde.

13. A glass fiber bundle as defined in claim 7 wherein the low molecular weight material is a polyepoxide.

References Cited

UNITED STATES PATENTS

| | | | |
|---|---|---|---|
| 3,215,585 | 11/1965 | Kneipple | 260—99.3 X |
| 3,116,192 | 12/1963 | Eilerman | 260—29.4 UA |
| 3,194,294 | 7/1965 | Van Gils | 260—29.3 |
| 3,424,608 | 1/1969 | Marzocchi et al. | 117—72 |
| 3,437,517 | 4/1969 | Eilerman et al. | 117—126 |
| 3,458,989 | 8/1969 | O'Brien et al. | 117—138 X |
| 3,509,018 | 4/1970 | Leshin et al. | 260—840 X |
| 3,407,087 | 10/1968 | Jinnette | 117—126 GQ |

JOAN B. EVANS, Primary Examiner

U.S. Cl. X.R.

117—126 GR, 126 GS; 161—170; 260—29.3, 38, 83